March 20, 1928.

C. A. PETERS

TRACTOR

Filed Jan. 15, 1923

INVENTOR
CORNELIUS A. PETERS
By Paul, Paul & Moore
ATTORNEYS

March 20, 1928.  1,662,982
C. A. PETERS
TRACTOR
Filed Jan. 15, 1923  3 Sheets-Sheet 2

INVENTOR
CORNELIUS A. PETERS
ATTORNEYS

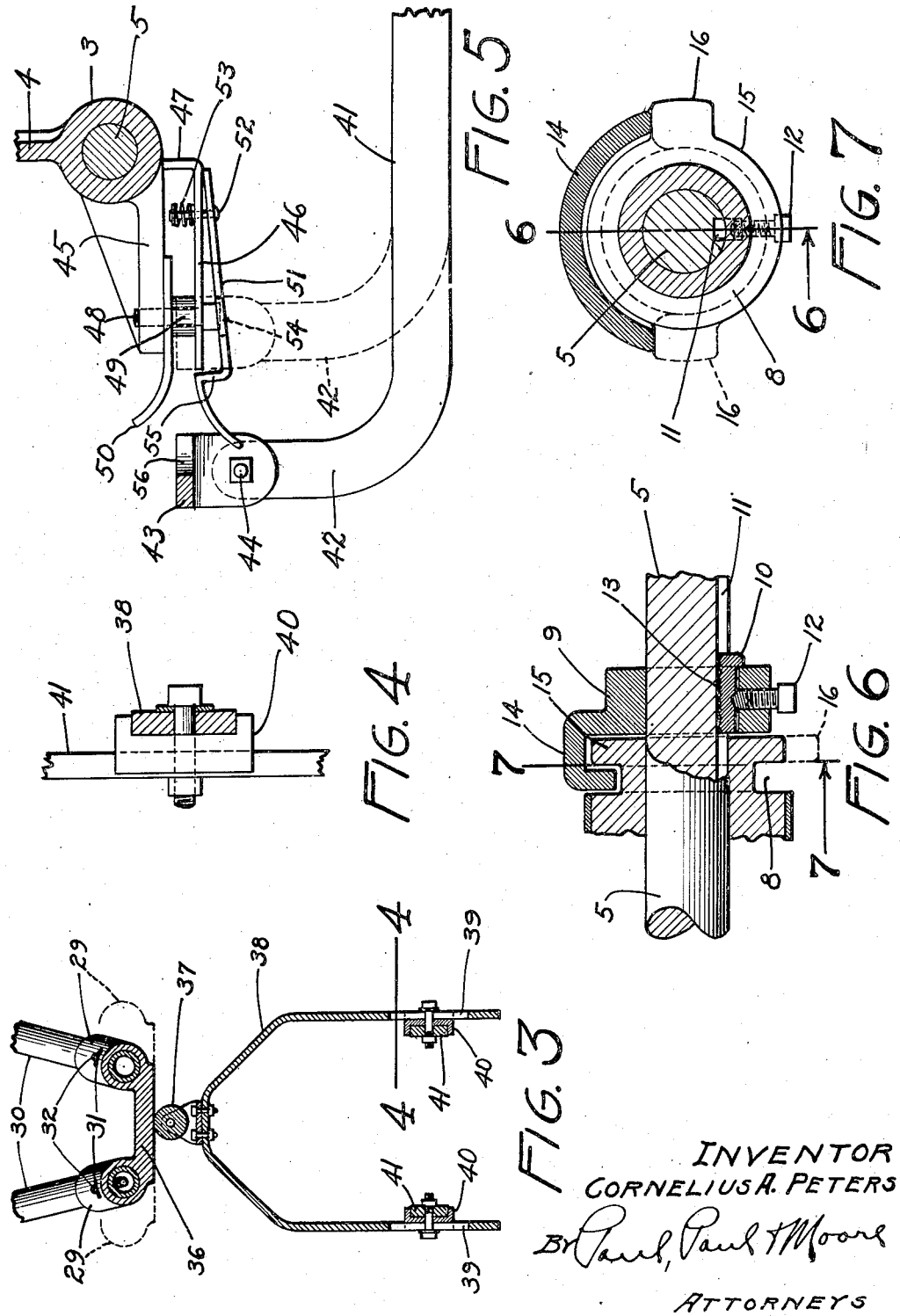

Patented Mar. 20, 1928.

1,662,982

UNITED STATES PATENT OFFICE.

CORNELIUS A. PETERS, OF MINNEAPOLIS, MINNESOTA, ASSIGNOR, BY MESNE ASSIGNMENTS, TO NEW BEEMAN TRACTOR COMPANY, OF MINNEAPOLIS, MINNESOTA, A CORPORATION OF MINNESOTA.

TRACTOR.

Application filed January 15, 1923. Serial No. 612,681.

The objects of my invention are:

First: To simplify the construction of the tractor and reduce the cost of manufacture and upkeep by providing a light one-piece support of simple construction whereto the driving motor is removably connected, and provide means for distributing the strain evenly on said support to permit such light construction;

Second: To eliminate the usual crank-shaft between the tractor wheels and provide a single straight axle without any differential mounted in a bearing at one end of the motor support;

Third: To simplify the mounting of the tractor wheels on said axle for lateral adjustment and reversal thereon;

Fourth: To provide an improved draft coupling connection between the axle and the draw-bars of the implement;

Fifth: To provide improved means for taking up downward thrust resulting from torque of the motor, relieve the load on the handle-bars and make the machine easier to operate;

Sixth: To eliminate all loose pins and bolts and provide a minimum of parts of inexpensive construction requiring practically no machine work or fitting when the elements of the tractor are assembled, and in general provide a machine of low cost adapted particularly for light work.

The invention consists generally in various constructions and combinations all as hereinafter described and particularly pointed out in the claims.

In the accompanying drawings forming part of this specification,

Figure 3 is a sectional view on the line 3—3 of Figure 1;

Figure 4 is a sectional view on the line 4—4 of Figure 3;

Figure 5 is a detail sectional view showing the manner of connecting the draw-bars to the motor supporting bracket;

Figure 6 is a sectional view on the line 6—6 of Figure 7;

Figure 7 is a sectional view on the line 7—7 of Figure 6.

Figure 1:
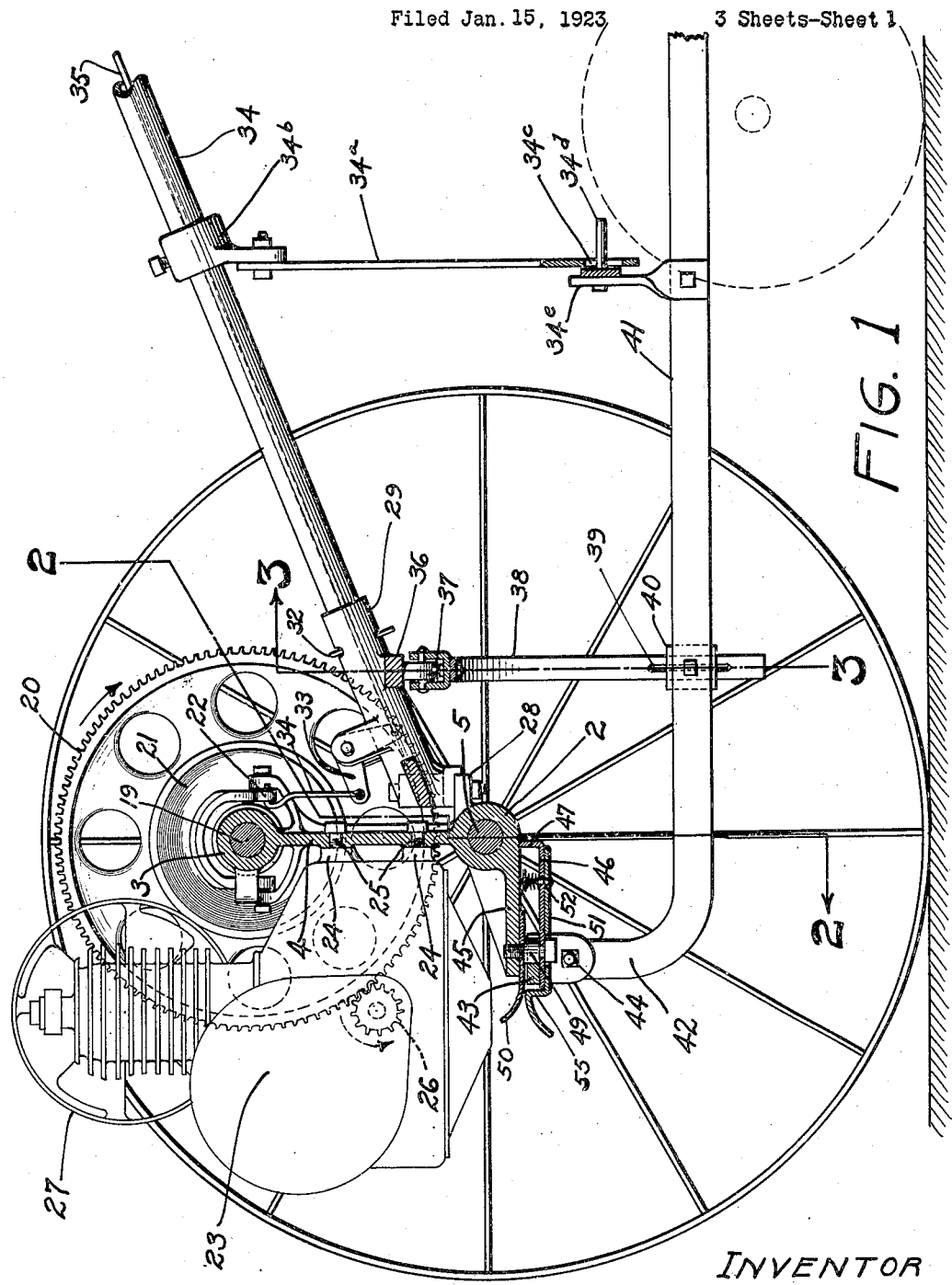
Figure 1 is a vertical sectional view on the line 1—1 of Figure 2.

In the drawing, the supporting bracket-like frame is shown as a one-piece casting composed of a lower bearing hub 2, an upper bearing hub 3, and an intermediate connecting web 4. A single straight axle 5 is mounted in the hub 2 and projects outwardly beyond the bracket frame on each side.

Traction wheels 6 and 7 are mounted on the ends of said axle and free to slide laterally thereon. The outer ends of said hubs have annular grooves 8 therein and collars 9 are mounted on said axle and have keys 10 fitting a keyway 11 in the axle and secured therein by set-screws 12. The inner faces of said keys are preferably toothed or roughened as indicated at 13, so that the keys will more securely grip the bottom of the keyway and prevent the collars from slipping. Each collar is provided with a curved flange 14 substantially semi-circular in form and curved to fit the annular groove 8 in the wheel hubs thereby preventing said hubs and the wheels from sliding in either direction on the axle but allowing a limited rotary movement thereof. The flanges 15 at the ends of the hubs have lugs 16 projecting outwardly therefrom, and the flange 14 overhangs the flange 15 in the path of the lug 16 on the hub as the wheel rotates, for the purpose of limiting the degree of rotation.

As shown in Figure 7, the flange 14 is substantially semi-circular and the lug on the hub has a degree of movement equal to half the circumference of the circle before contacting with the flange 14. This freedom of rotary movement of the wheels is for the purpose of compensating for the difference in travel when the machine is turning and dispenses with the usual differential and divided axle.

Besides being laterally adjustable on the axle, the wheels are reversible so that the locking collars 9 will be on the inner side of the wheels instead of on the outer side as shown, and when this is done, the hubs of the wheels can be projected a considerable distance beyond the ends of the axle and the width of tread of the machine thereby considerably increased. With this manner of mounting the wheels, the width of tread of the machine can be easily and quickly increased or decreased to adapt the machine for the width of the rows of plants between which it is working.

Figure 2:
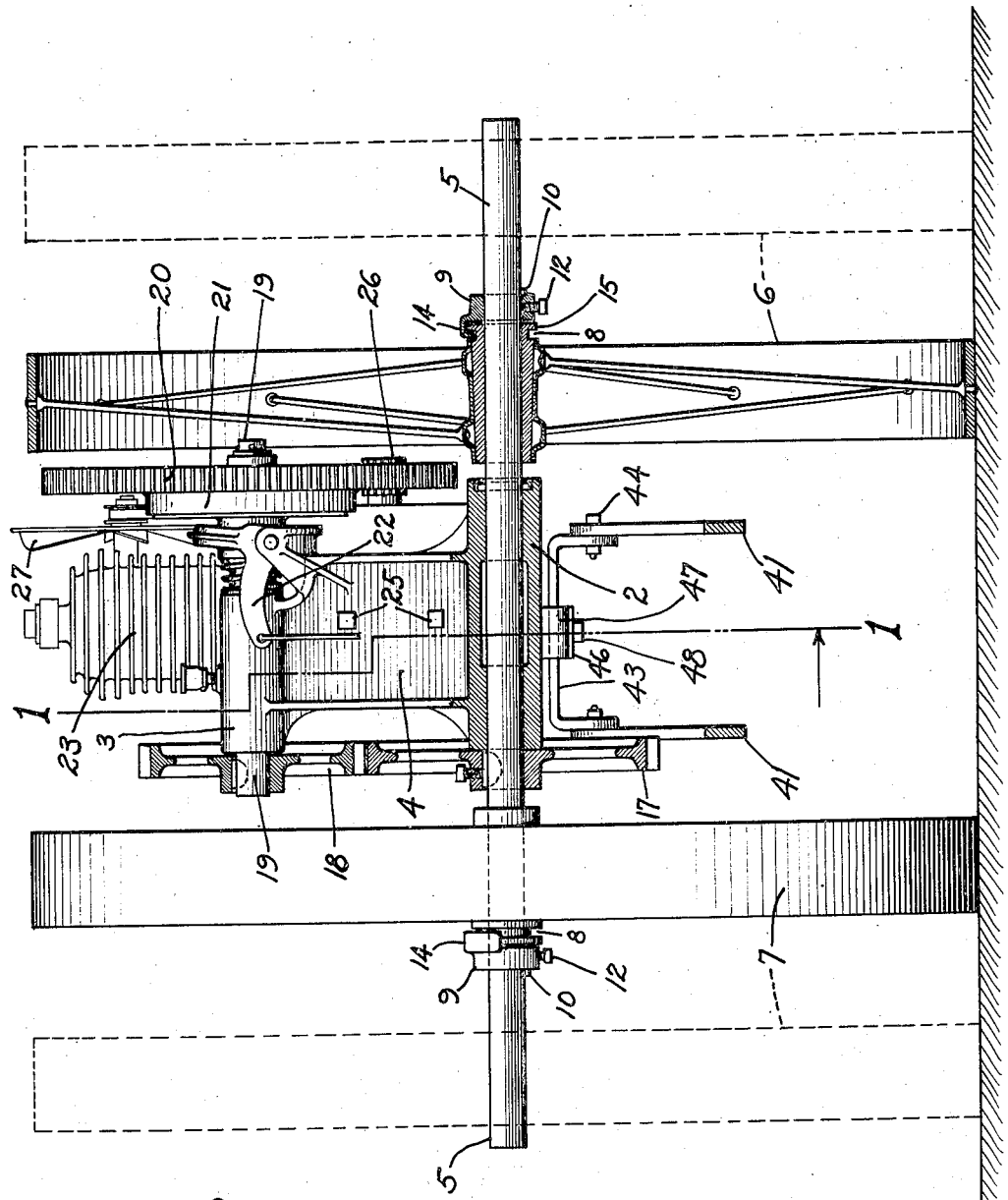
Figure 2 is a vertical sectional view on the line 2—2 of Figure 1.

At one end of the bearing hub 2 is a gear 17 keyed on the axle and meshing with a smaller gear 18 that is secured to a shaft 19 mounted in the bearing hub 3 parallel with the straight axle. The shaft 19 projects through the opposite end of the bearing hub 3 and carries a large driving gear 20 loosely mounted thereon. The inner face of this gear has a friction clutch 21 mounted thereon, provided with an operating lever 22. With the clutch in the position shown in Figure 2, the gear will be locked on the shaft to drive the gears 18 and 17 and the axle. Movement of the lever 22 however will disengage the clutch and allow the gear 20 to run idle. This arrangement of the driving gears insures an even distribution of the strain upon the motor supporting bracket and permits it to be of comparatively light construction. I may, of course, drive direct from the large gear to the axle, but the arrangement shown is preferred.

A motor 23 of the single-cylinder air-cooling type is provided and has bosses 24 which are seated against the web 4 of the supporting bracket. Bolts 25 pass through said web and are tapped into said bosses and rigidly support the motor on the bracket in the position shown in Figure 1, with the driving pinion 26 of the motor in mesh with the drive gear 20. This motor may be of any suitable design adapted for this purpose and may be easily and quickly mounted on the bracket frame in the manner described and as readily removed. It has the usual fan 27 and projects upwardly between the wheels in front of the bracket where it is conveniently accessible and where its weight will tend to impart a forward tilting movement to the bracket frame and wheels. Separation of the motor from the rest of the machine is accomplished by removing the bolts, whereupon the motor pinion will drop out of its meshing engagement with the large gear wheel and permit removal of the motor.

The bearing hub 2 has rearwardly projecting lugs 28 whereon studs 29 are mounted and provided with sockets to receive steering posts 30; the walls of said studs having transverse slots 31 through which pins 32 on said posts project and slide when said posts are rotated. A bell-crank 33 is mounted in bearings on one of said studs and has a link connection 34 with the lever 22, and a rod 35 within one of the posts connects the bell-crank 33 with a lever on the handle-bars of the posts, not shown. By this means, the friction clutch is operated to lock or release the driving gear.

On the under side of the studs 29, is a bar 36 having a flat under surface to contact with a wheel 37 on a yoke 38 having depending parallel arms provided with vertical slots 39 and clamps 40 wherein draw-bars 41 are fitted and secured, vertical adjustment of the yoke on the draw-bars being permitted by means of the clamps 40 and the slots 39. The rear of the draw-bars is connected with a suitable implement such as a cultivator, disk harrow or other ground-working implement. The forward ends of the draw-bars have upwardly turned portions 42 to which a yoke 43 is secured by suitable means such as bolts 44.

The bearing hub 2 has a forwardly projecting horizontal arm 45. A plate 46 has an upwardly turned end portion 47 to bear on the under side of the bearing hub 2, and a bolt 48 passes through this plate into the arm 45 and has a spacing collar 49 thereon between the plate 46 and a guide plate 50 that is seated against the under side of the arm 45. The end of the guide 50 is upwardly turned and a latch 51 is mounted on the plate 46 by means of a bolt 52 and yieldingly held by a spring 53. This latch has a socket 54 to receive the head of the bolt 48 and also has an upwardly turned end portion 55 which extends up across the space between the plate 46 and the guide 50 and normally holds the yoke 43 from slipping out of its position between said plates, said yoke having a recess 56 therein to receive the spacing collar 49. With this coupling device, the draw-bars may be easily and quickly disengaged from the tractor by pulling down on the locking latch to the position shown in Figure 5, and when it is desired to connect the draw-bars with the tractor, it is only necessary to engage the yoke 43 with the forward ends of the latch and the guide plate and exert horizontal pressure thereon when the plates will separate and automatically allow the yoke to slip in between them to its locking position. This connecting of the draw-bars to the tractor may be accomplished by the operator by moving the tractor to a point astride of the draw-bars in the rear of their upwardly turned ends and then pushing the machine forward until the yoke on the draw-bars engages and interlocks with the arm coupling.

One purpose of connecting the draft bars to the tractor at a point in front of the axle is to cause the bars and implements to initially turn in the same direction as the tractor. Evidently, the arm 45 will swing in the same direction as the traction wheels and impart a similar movement to the draw-bars, and they in turn will oscillate the implements in the same direction, whereas if connection had been made in the rear of the axle, the first movement of the draw-bars would be opposite to the direction the tractor is being turned. The operator of the tractor with the form of connection shown herein between the draw-bars and the axle has quicker and better control over the implements in addition to the quick detachable coupling or connection between the draw-bars and the forwardly projecting arm.

The bearing of the bar 36 on the wheel or roller 37 allows the steering posts to be always held on the same level even when the tractor is turned, which might not be the case if there was a pivotal connection between the posts and the yoke 38. Furthermore, this bearing allows the posts to be lifted without raising the draft bars, and still during the operation of the machine the down thrust of the motor will be transmitted through the yoke to the draft bars, and relieve the operator of the load on the handlebars and render the machine much easier to handle.

To prevent the machine from tipping forwardly, and allow the operator to transmit downward pressure to the implement or lift it or control its lateral movement, I provide a bar $34^a$ connected at its upper end to a hub $34^b$ mounted on each steering post, the lower end of each bar having a slot $34^c$ therein to receive a pin $34^d$ on which said bar slides for a limited distance and prevents the machine from tipping forwardly and downwardly under the weight of the motor, the pin $34^d$ being supported in an arm $34^e$ that is mounted on the draft bar as shown in Figure 1; thus preventing the weight of the motor from overbalancing and raising the steering posts to a point above their normal working position when the machine is at rest. Evidently, there is considerable more weight in front of the axle than in the rear thereof as far as the structure of the motor and its parts are concerned, and any tendency of the apparatus to tilt forwardly and downwardly, due to such position of the motor, will be counteracted through the connection of the steering posts with the frame of the implement with which the tractor is being used.

In various ways, the details of construction herein shown may be modified and still be within the scope of my invention.

I claim as my invention:

1. A two-wheel traction machine comprising a one-piece axle and traction wheels therefor, a bracket of comparatively light construction journaled on said axle between said wheels, a shaft mounted in said bracket parallel with said axle, a motor secured to said bracket between said shaft and axle, one end of said shaft having a driving connection with said axle and the other end of said shaft having a clutch controlled gear connection with said motor, thereby evenly distributing the strain upon said bracket.

2. A machine of the class described, comprising a straight axle, wheels mounted thereon, a bracket of comparatively light construction having a hub at one end journaled on said axle between said wheels and provided with a flat upwardly projecting web, a second hub upon the upper portion of said web, a shaft journaled in said second hub, a motor removably secured to said web between said hubs and having a clutch controlled driving connection with one end of said shaft, the other end of said shaft having a driving connection with said axle.

3. A machine of the class described comprising an axle, wheels mounted thereon, a one-piece bracket having its lower portion journaled on said axle between said wheels, and projecting upwardly therefrom, a shaft mounted in the upper portion of said bracket, a motor having a driving pinion and means for securing said motor to said bracket between said shaft and axle, one end of said shaft having a gear connection with said axle, the other end of said shaft having a clutch controlled gear connection with said driving pinion.

4. A machine of the class described comprising an axle, supporting and traction means therefor, a one-piece casting having a hub at its lower end journaled on said axle between said traction means, said casting having a web projecting upwardly from said hub, and a second hub integral with the upper portion of said web, a motor seated against said web and having means for securing it thereto, and provided with a driving pinion, a shaft mounted in said second hub, a comparatively large gear mounted on said shaft and meshing with said pinion, and driving connections between said shaft and said axle, release of said motor from said web allowing the separation of said pinion from said gear.

5. A machine of the class described comprising a bracket frame having an axle and traction and supporting means, a motor mounted on said bracket frame, a steering device connected with said bracket frame for oscillating it and said traction and supporting means on a vertical axis to steer the machine, draft bars connected with said bracket frame beneath said steering device, means adjacent said bracket frame for transmitting to said draft bars the downward thrust on said steering device resulting from the torque of the motor, and relieving the steering device of such thrust, and means connecting said steering device with said draft bars in the rear of said thrust transmitting means for lifting said draft bars and controlling the lateral movement thereof, or transmitting thereto and to the implements connected therewith, the downward pressure of the operator upon said steering device.

In witness whereof, I have hereunto set my hand this 10th day of January, 1923.

CORNELIUS A. PETERS.